(12) United States Patent
Gaitonde et al.

(10) Patent No.: US 12,461,877 B2
(45) Date of Patent: Nov. 4, 2025

(54) 3D STACKED DEVICE HAVING IMPROVED DATA FLOW

(71) Applicant: XILINX, INC., San Jose, CA (US)

(72) Inventors: Dinesh D. Gaitonde, Fremont, CA (US); Aashish Tripathi, Hyderabad (IN); Ashit Debnath, Hyderabad (IN); Davis Boyd Moore, Longmont, CO (US); Maithilee Rajendra Kulkarni, Santa Clara, CA (US); Abhishek Kumar Jain, Ghaziabad (IN)

(73) Assignee: XILINX, INC., San Jose, CA (US)

( * ) Notice: Subject to any disclaimer, the term of this patent is extended or adjusted under 35 U.S.C. 154(b) by 217 days.

(21) Appl. No.: 18/134,994

(22) Filed: Apr. 14, 2023

(65) Prior Publication Data

US 2024/0345977 A1    Oct. 17, 2024

(51) Int. Cl.
*G06F 13/40*    (2006.01)

(52) U.S. Cl.
CPC ...... *G06F 13/4059* (2013.01); *G06F 13/4068* (2013.01)

(58) Field of Classification Search
None
See application file for complete search history.

(56) References Cited

U.S. PATENT DOCUMENTS

| | | | |
|---|---|---|---|
| 2001/0023466 A1* | 9/2001 | Farmwald | G11C 8/12 |
| | | | 711/E12.089 |
| 2023/0104845 A1* | 4/2023 | Ray | G06F 7/08 |
| | | | 711/126 |

* cited by examiner

*Primary Examiner* — Farley Abad
*Assistant Examiner* — Dayton Lewis-Taylor
(74) *Attorney, Agent, or Firm* — Patterson + Sheridan, LLP (57) ABSTRACT

A 3D device includes a first semiconductor chip and a second semiconductor chip stacked vertically. The first semiconductor chip includes a first plurality of tiles. The second semiconductor chip includes a second plurality of tiles. A bus electrically couples each of the first plurality of tiles to a corresponding one of the second plurality of tiles based on assignments of the first plurality of tiles and the second plurality of tiles to tile-to-tile pairs that define a minimized sum of bus delays among each possible tile-to-tile pairs. In each tile-to-tile pair, a net electrically couples each of a first plurality of pins to a corresponding one of a second plurality of pins based on assignments of the first plurality of pins to the second plurality of pins that define a minimized sum of net delays among each possible pin-to-pin pairs.

20 Claims, 8 Drawing Sheets

3D STACKED DEVICE HAVING IMPROVED DATA FLOW

TECHNICAL FIELD

Examples of the present disclosure generally relate to improving bandwidth of data flow in a three-dimensional (3D) stacked device containing a plurality of semiconductor chips.

BACKGROUND

In a two-dimensional (2D) semiconductor device, different integrated circuits are disposed on a common substrate and are connected through conductive interposers therein. This topology limits the amount of data that can be transferred between, for example, data processing components and memory components as the number of connections between the components is limited by, among other things, the finite area of the substrate.

In a 3D stacked device, semiconductor chips (or dies) are stacked in the Z dimension, which allows for vertical connectivity among various components in different layers. While 3D devices in general allow a greater number of connections as compared to 2D devices, they face a challenge of efficiently placing and routing channels of data communication. For example, to achieve an aggregate bandwidth of 1 TBps (Tera Bytes per second), there is a need to get 26 k/19 k nets from/to compute array to/from high bandwidth memory (HBM) (45K in total). Each net needs to meet performance specification of 500 MHz. The existing Placer and Router (PnR) solutions are inadequate for solving routing congestion and low bandwidth issues in 3D inter-chip communication.

SUMMARY

Techniques for providing improved data flow in a 3D stacked device are described.

According to one example, there is provided a method for forming a 3D stacked device having a plurality of semiconductor chips stacked vertically on each other, where the method includes providing a first plurality of tiles in a first semiconductor chip of the plurality of semiconductor chips, providing a second plurality of tiles in a second semiconductor chip of the plurality of semiconductor chips, determining a minimized sum of bus delays among all possible tile-to-tile pairs, assigning each of the first plurality of tiles in the first semiconductor chip and a corresponding one of the second plurality of tiles in the second semiconductor chip to a tile-to-tile pair based on the minimized sum, and electrically coupling each of the first plurality of tiles to the corresponding one of the second plurality of tiles through respective buses based on the assignments.

According to another example, there is provided a method for forming a 3D stacked device, where the method includes providing a first plurality of tiles in a first semiconductor chip, providing a second plurality of tiles in a second semiconductor chip stacked vertically on the first semiconductor chip, providing a third semiconductor chip between the first and second semiconductor chips, determining a least of total bus delays among all possible tile-to-tile pairs, and electrically coupling each of the first plurality of tiles to the corresponding one of the second plurality of tiles using respective buses on the third semiconductor chip based on the least of total bus delays.

According to another example, there is provided a method for forming a 3D stacked device, where the method includes providing a first plurality of tiles in a first semiconductor chip, providing a second plurality of tiles in a second semiconductor chip stacked vertically on the first semiconductor chip, providing a third semiconductor chip between the first and second semiconductor chips, determining a least of total bus delays among all possible tile-to-tile pairs, grouping each of the first plurality of tiles in the first chip and a corresponding one of the second plurality of tiles in the second chip to a tile-to-tile pair based on the least of total bus delays, providing a first plurality of pins in a first tile of each of the grouped tile-to-tile pairs, providing a second plurality of pins in a second tile of a corresponding one of the assigned tile-to-tile pairs, determining a least of total net delays among all possible pin-to-pin pairs within the grouped tile-to-tile pairs, and electrically coupling each of the first plurality of pins to a corresponding one of the second plurality of pins using a net on the third semiconductor chip based on the least of total net delays.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive explanation of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Examples herein describe techniques for forming 3D stacked devices having improved inter-chip data flow. The 3D stacked devices include a plurality of semiconductor chips stacked in a vertical direction. In one embodiment, a 3D stacked device includes a base layer having network-on-chip (NoC) components, a middle layer having programmable logic, and a top layer having artificial intelligence engine (AIE) components (e.g., AIE processors, AIE memories, support for dynamic memory access (DMA), locks, and etc.). These components may be arranged in two-dimensional arrays of tiles (e.g., having a repeating pattern) in their respective layers. In operation, the NoC components in the bottom layer may be used to drive the AIE compute and/or memory components in the top layer. The 3D device allows for vertical inter-chip data movement between different components, for example, through interfaces, interconnects, conductive traces, through silicon vias (TSVs) or other communication means.

Embodiments of the present disclosure focus on aligning interfaces to improve bandwidth of data flow applications in the 3D stacked device. For example, each of the NoC tiles in the base layer may be assigned to a corresponding one of the AIE tiles in the top layer for vertical alignment. The alignment of the tiles is optimized to minimize worst case latency in data movement between, for example, a chiplet interface and a memory or compute interface, each on different layers. Connection among the actual pins in the aligned tiles is also optimized to reduce routing congestion and achieve least-latency and highest bandwidth inter-chip data communication.

Figure 1:
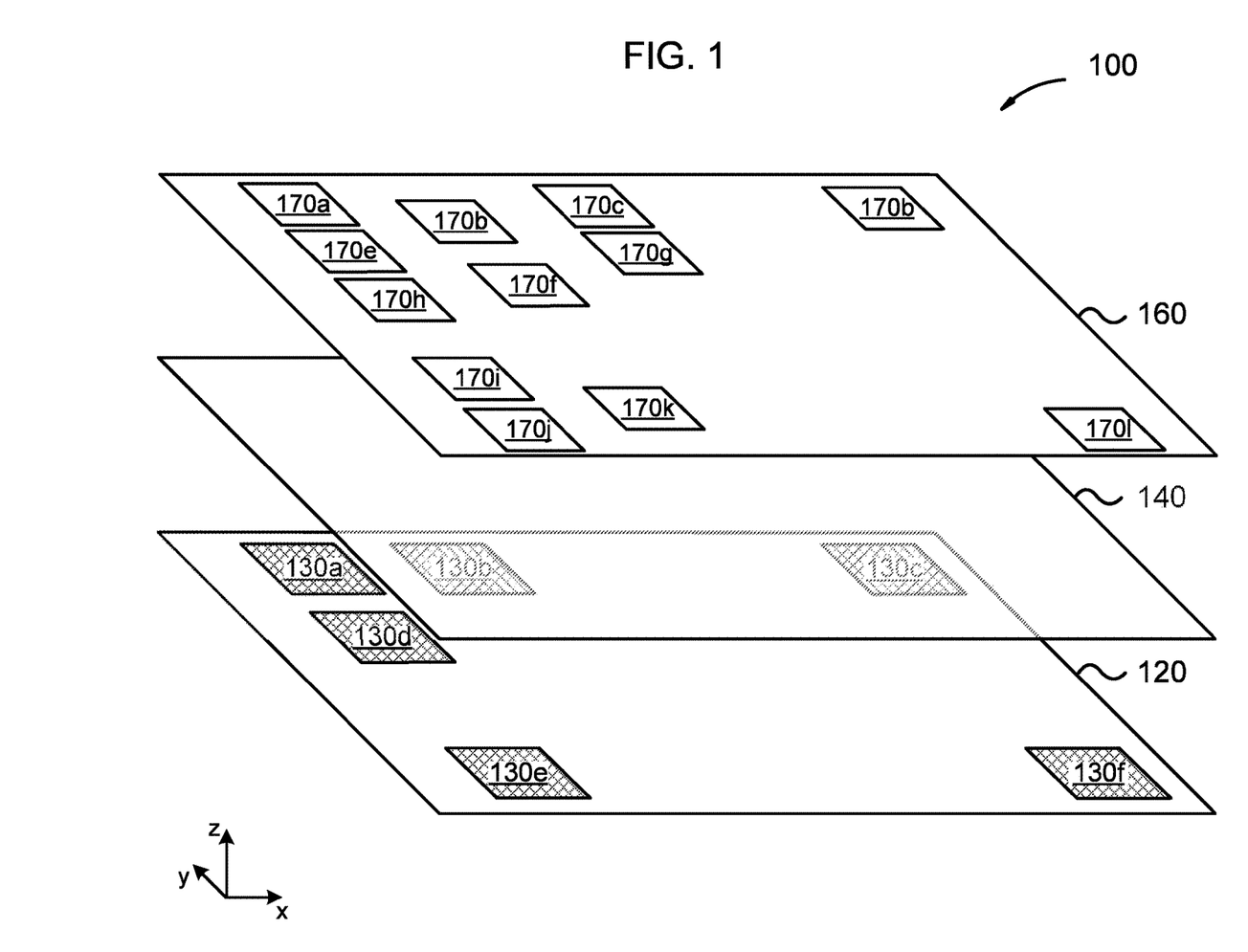
FIG. 1 illustrates a 3D stacked device, according to an example.

FIG. 1 illustrates a 3D stacked device 100, according to an example. As illustrated in FIG. 1, the 3D stacked device 100 includes three semiconductor chips 120, 140, and 160 vertically stacked over each other.

In this example, the semiconductor chip 120 includes a total number of F (e.g., F=6) tiles (e.g., tiles 130a, 130b, 130c, 130d, 130e, and 130f (collectively referred to as "the tiles 130")). In one embodiment, the circuitry and its arrangement in each of the tiles 130 is identical. As such, the tiles 130 in the chip 120 may perform identical functions. For example, the tiles 130 may include NoC Master Unit (NMU) tiles. In another embodiment, the circuitry and its arrangement in each of the tiles 130 may be different and perform different functions.

In this example, the semiconductor chip 140 may include programmable logic circuitry (not explicitly shown) for transferring data. The programmable logic circuitry may have a tiled architecture. In one embodiment, the semiconductor chip 140 may include field-programmable gate arrays (FPGAs) and the like.

As illustrated in FIG. 1, the semiconductor chip 160 includes a total number of L (e.g., L=12) tiles (e.g., tiles 170a, 170b, 170c, 170d, 170e, 170f, 170g, 170h, 170i, 170j, 170k, and 170l (collectively referred to as "the tiles 170")). In this example, the number of tiles 130 is less than or equal to the number of tiles 170 (i.e., F≤ L), although it should be understood that the number of tiles 130 can be greater than the number of tiles 170 in other examples. In one embodiment, the circuitry and its arrangement in each of the tiles 170 is identical. As such, the tiles 170 in the chip 160 may perform identical functions. For example, the tiles 170 may include data processing tiles (e.g., artificial intelligence (AI) engine (AIE) compute tiles). In another example, the tiles 170 may include memory tiles (e.g., AIE memory tiles or direct memory access (DMA) tiles). In another embodiment, the circuitry and its arrangement in each of the tiles 170 may be different and perform different functions.

Although not explicitly shown in FIG. 1, there are a total number of F buses (e.g., data buses) each coupling one of the tiles 130 to a corresponding one of the tiles 170. In one embodiment, each of the F buses is identical logically. In each bus, there are a total number of N nets (not explicitly shown). In addition, there are a total number of Np pins (not explicitly shown) in each of the tiles 130, and a total number of $M_P$ pins (not explicitly shown) in each of the tiles 170.

In this example, the pins allocated for the tiles 130 are grouped into identical partitions, each of which contains Np pins. The tiles (or partitions) 130 are each identical and spaced out at an offset from their neighbors. When a tile 130 is assigned to a tile-to-tile group with a corresponding tile 170, its pins are mapped to the pins that belong to that group's partition.

The same is true for the $M_P$ pins in each of the tiles 170. That is, the pins allocated for the tiles 170 are grouped into identical partitions, each of which contains $M_P$ pins. The tiles (or partitions) 170 are each identical and spaced out at an offset from their neighbors. When a tile 170 is assigned to a tile-to-tile group with a corresponding tile 130, all of its pins are mapped to the pins that belong to that group's partition.

In one embodiment, as the chip 140 may include programmable logic circuitry having a tiled architecture, when the physical pins are assigned for one of the tiles 130 (or tiles 170), the physical pins for the other tiles 130 (or tiles 170) are also assigned identically. In other embodiments, the pins for each of the paired tiles 130 and 170 can be assigned independently.

As shown in FIG. 1, not all the tiles 170 are aligned with the tiles 130 along the Z direction. Also, depending on the locations of the TSV columns in the chip 140, routing data between the chips 120 and 160 through the chip 140 should be meticulously designed to minimize transmission latency, maximize data bandwidth, and reduce routing congestion.

Although the tiles 130 and 170 are shown to be physically separate (e.g., as chiplets) in FIG. 1, it should be understood that the tiles 130 and 170 may be logical divisions of their respective chips rather than physical divisions. Also, for clarity, the chips 120, 140, and 160 are shown as being spaced apart, but in operation are bonded together to establish physical connections and communication paths (or channels) between the chips. For example, solder bumps, interconnects, conductive traces, TSVs or other communication means can be used to enable the chips 120, 140, and 160 to communicate. Further, the chips 120, 140, and 160 may be encased in a protective material, e.g., an epoxy to provide further structural support and protection when being packaged. Although three chips are shown in FIG. 1, the 3D stacked device 100 may include more or less than three chips (e.g., two, four, five, or six chips).

Figure 2A:
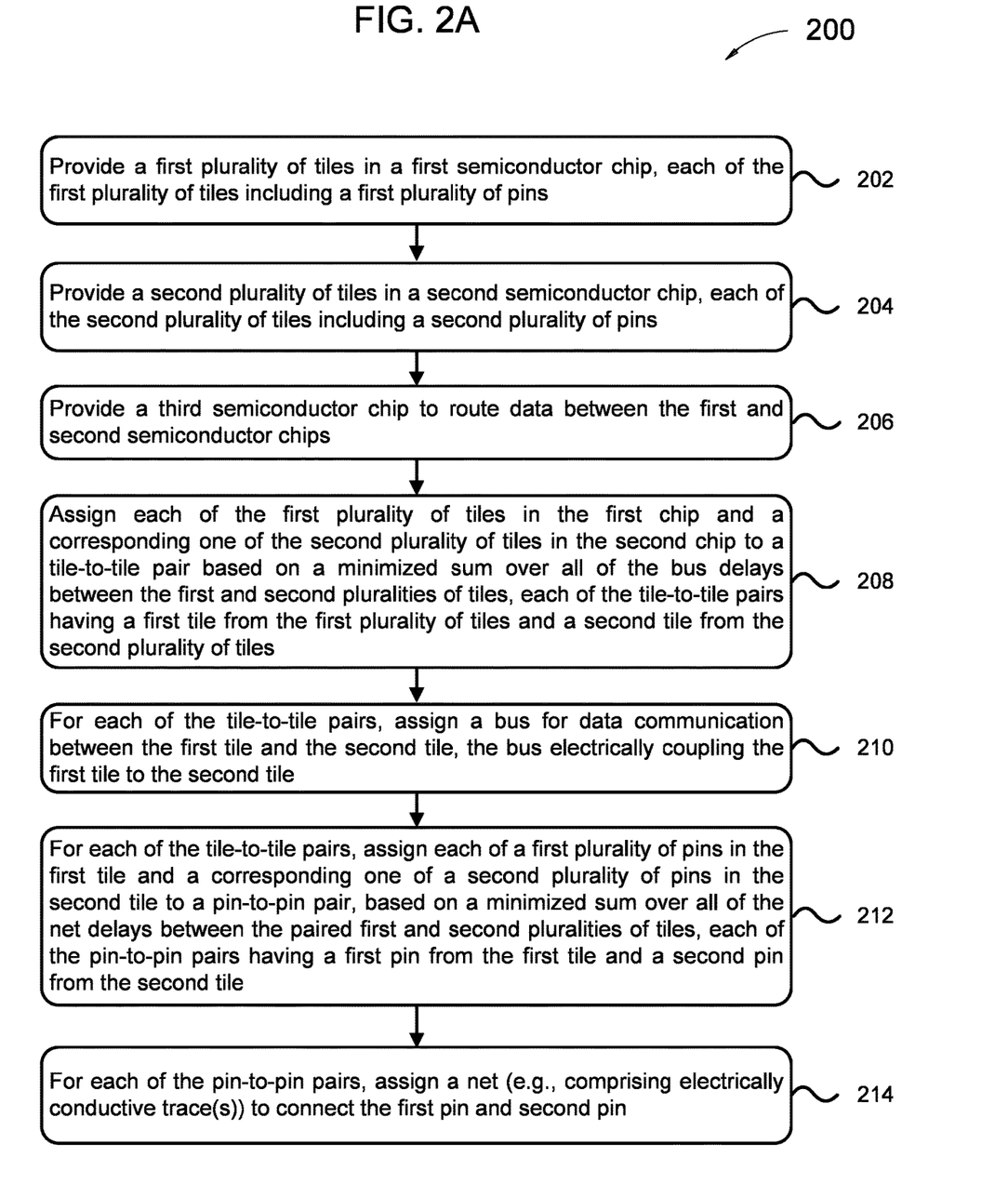
FIG. 2A illustrates a flowchart for forming a 3D stacked device with improved data flow, according to an example.

FIG. 2A illustrates a flowchart 200 of a method for forming a 3D stacked device with improved data flow, according to an example. As shown in FIG. 2A, the flowchart 200 includes blocks 202, 204, 206, 208, 210, 212, and 214.

In block 202, the flowchart 200 includes providing a first plurality of tiles in a first semiconductor chip, each of the first plurality of tiles including a first plurality of pins. In one example, the first plurality of tiles may substantially correspond to the tiles 130 in the semiconductor chip 120 in FIG. 1.

In block 204, the flowchart 200 includes providing a second plurality of tiles in a second semiconductor chip, each of the second plurality of tiles including a second plurality of pins. In one example, the second plurality of tiles may substantially correspond to the tiles 170 in the semiconductor chip 160 in FIG. 1.

In block 206, the flowchart 200 includes providing a third semiconductor chip for routing data between the first and second semiconductor chips. In one example, the third semiconductor chip may substantially correspond to the semiconductor chip 140 in FIG. 1.

In block 208, the flowchart 200 includes assigning each of the first plurality of tiles in the first chip and a corresponding one of the second plurality of tiles in the second chip to a pin group (e.g., a tile-to-tile pair) based on a minimized sum over all bus delays between the first and second pluralities of tiles. Each of the physical pin groups includes pins of a first tile from the first plurality of tiles and pins of a second tile from the second plurality of tiles. Details of the pin group assignment are described with reference to FIG. 2B below.

In block 210, the flowchart 200 includes, for each of the tile-to-tile pairs, assigning a bus between the first tile and the second tile. The bus may be used for inter-chip data communication between each paired tiles.

In block 212, the flowchart 200 includes, for each of the tile-to-tile pairs, assigning each of the first plurality of pins in the first tile and a corresponding one of the second plurality of pins in the second tile to a pin-to-pin pair based on a minimized sum over all net delays between the paired first and second pluralities of tiles, each of the pin-to-pin pairs having a first pin from the first tile and a second pin from the second tile. Details of the actual pin assignment are described with reference to FIG. 2C below.

In block 214, the flowchart 200 includes, for each of the pin-to-pin pairs, assigning a net (e.g., comprising electrically solder bumps, interconnects, conductive traces, TSVs or other communication means) to connect the first pin and second pin.

Figure 2B:
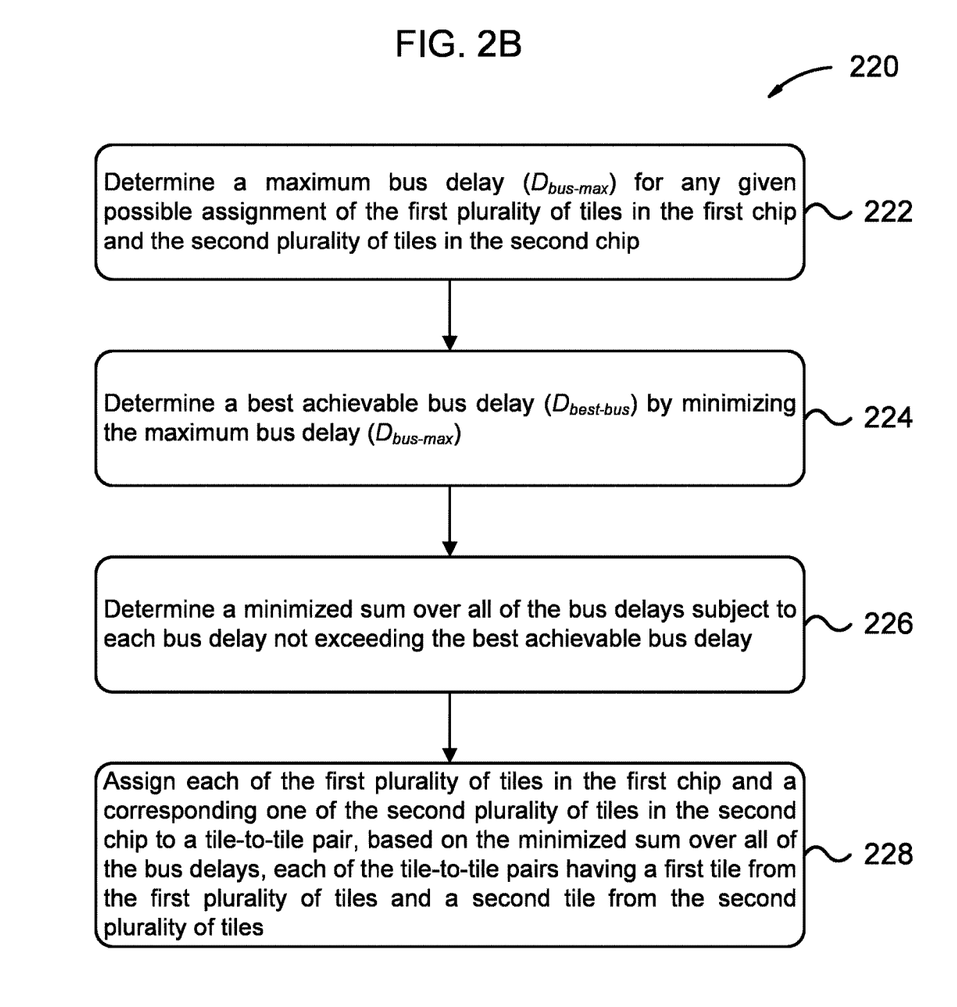
FIG. 2B illustrates a flowchart for pin group assignments in a 3D stacked device with improved data flow, according to an example.
Figure 3A:
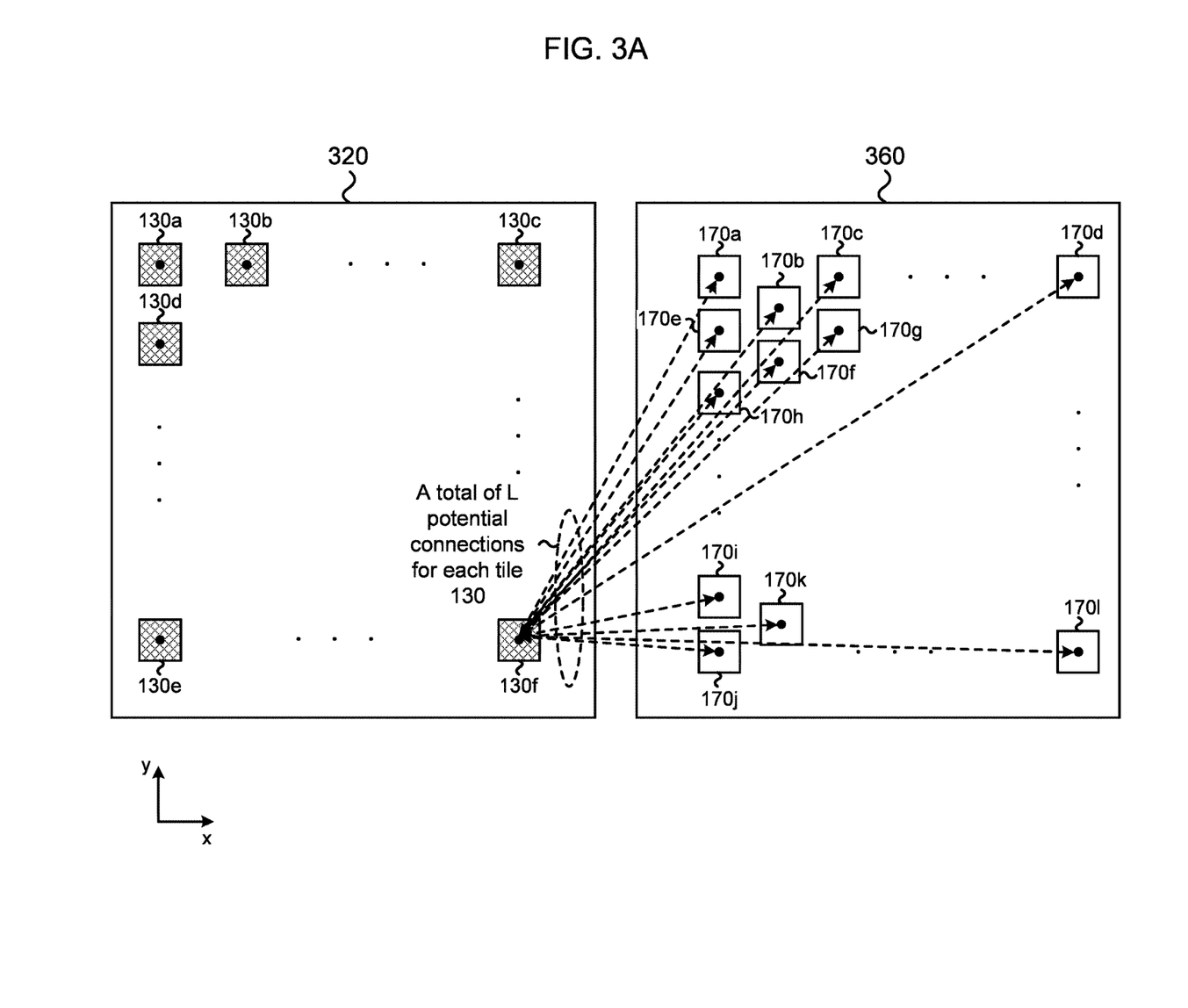
FIG. 3A illustrates a portion of a 3D stacked device with improved data flow, according to an example.

FIG. 2B illustrates a flowchart 220 for pin group assignments in a 3D stacked device with improved data flow, according to an example. In one embodiment, the flowchart 220 may substantially correspond to block 208 in FIG. 2A for assigning each of the first plurality of tiles in the first chip and a corresponding one of the second plurality of tiles in the second chip to a pin group (e.g., a tile-to-tile pair). With reference to FIG. 3A, the flowchart 220 is a global pin assignment approach to assign the tiles 130 and 170 to physical pin groups to be connected by data buses (e.g., each bus connecting one tile 130 to one tile 170) so that the resulting group assignments optimize vertical alignment of the tiles 130 and 170 to minimize the worst case latency in data movement among different layers in the 3D stacked device. It is noted that, FIG. 3A illustrates a portion of a 3D stacked device with improved data flow, according to an example. In FIG. 3A, chips 320 and 360 may substantially correspond to the chips 120 and 160, respectively, in FIG. 1.

Referring back to FIG. 2B, in block 222, the flowchart 220 determines a maximum bus delay ($D_{bus-max}$) for any given possible assignment of the first plurality of tiles in the first chip and the second plurality of tiles in the second chip. As illustrated in FIG. 3A, the total number of the tiles 130 in the chip 320 is an integer number, F (e.g., F=6), and the total number of the tiles 170 in the chip 360 is another integer number, L (e.g., L=12). For each possible assignment, each of the F number of tiles 130 are assigned to one of the L number of tiles 170. That is, for each possible assignment, there are a total of F connections (or buses). $D_{bus-max}$ is the maximum delay among all of the F connections for any given possible assignment. For example, for each assignment of F connections from the tiles 130 to tiles 170, there is a $D_{bus-max}$. As illustrated in FIG. 3A, each connection is assumed to start from the geometric center of a tile 130 and terminate at the geometric center of a tile 170, or vice versa. It is noted that the delay of a bus between a tile 130 and a tile 170 is proportionally related to the distance between the geometric centers of the tiles projected on the x-y plane, for example, along the x and y axes. For example, there may be a chip having programmable logic (not explicitly shown) between the chips 320 and 360 for routing data, similar to the chip 140 between the chips 120 and 160 in FIG. 1. That is, the delay of a bus is proportionally related to the distance that the bus has to travel on the chip 140.

In block 224, the flowchart 220 determines a best achievable bus delay ($D_{best-bus}$) by minimizing the maximum bus delay ($D_{bus-max}$). For example, after the maximum bus delay ($D_{bus-max}$) for all possible assignments are determined in block 222, the flowchart 220 in block 224 determines the smallest maximum bus delay among all possible assignments and assigns the value to the best achievable bus delay ($D_{best-bus}$).

In block 226, the flowchart 220 further determines a minimized sum over all of the bus delays subject to each bus delay not exceeding the best achievable bus delay. For example, block 226 minimizes:

$$\sum Conn(a, b) * Cost(a, b), \qquad \text{Equation (1),}$$

under the constraint $D_{bus-max} \leq D_{best-bus}$.

In Equation (1) above, Conn(a, b) is a Boolean variable which decides whether the $a^{th}$ tile 130 is connected to the $b^{th}$ tile 170. It should be understood that, with reference to FIG. 3A, since there are a total of F×L possible connections between the tiles 130 and 170, there are F×L variables for Conn(a, b).

In this example, because F≤L, each of the tiles 170 terminates at most one bus. Hence, for all b, $$\sum_{\forall a} Conn(a, b) \leq 1. \qquad \text{Equation (2)}$$

Also, each of the tiles 130 starts exactly one bus. Hence, for all a, $$\sum_{\forall b} Conn(a, b) = 1. \qquad \text{Equation (3)}$$

Referring back to Equation (1), Cost(a, b) is the cost of a bus connecting the $a^{th}$ tile 130 to the $b^{th}$ tile 170. In this example, the cost is also proportionally related to the distance between the geometric center of the $a^{th}$ tile 130 to the geometric center of the $b^{th}$ tile 170 projected on the x-y plane, for example, along the x and y axes. It is noted that, with reference to FIG. 3A, because the locations of the tiles 130 and 170 are known, the Cost(a, b) is also known for each of the F×L connections (or buses).

In this example, the performance of the device having chips 320 and 360 is dictated by the maximum delay of all buses. As such, the following relationship holds:

$$D_{bus-max} \geq Cost(a, b) \times Conn(a, b). \qquad \text{Equation (4).}$$

Once the minimized sum over all the bus delays is determined, the Conn(a, b) variables that result in the minimized sum are also determined. In block 228, the flowchart 220 assigns each of the first plurality of tiles in the first chip and a corresponding one of the second plurality of tiles in the second chip to a physical pin group (e.g., a tile-to-tile pair), based on the Conn(a, b) variables that result in the minimized sum. In other words, the assignments of the first plurality of tiles to the second plurality of tiles in flowchart 220 define the minimized sum of all bus delays among all possible tile-to-tile pairs.

Figure 3B:
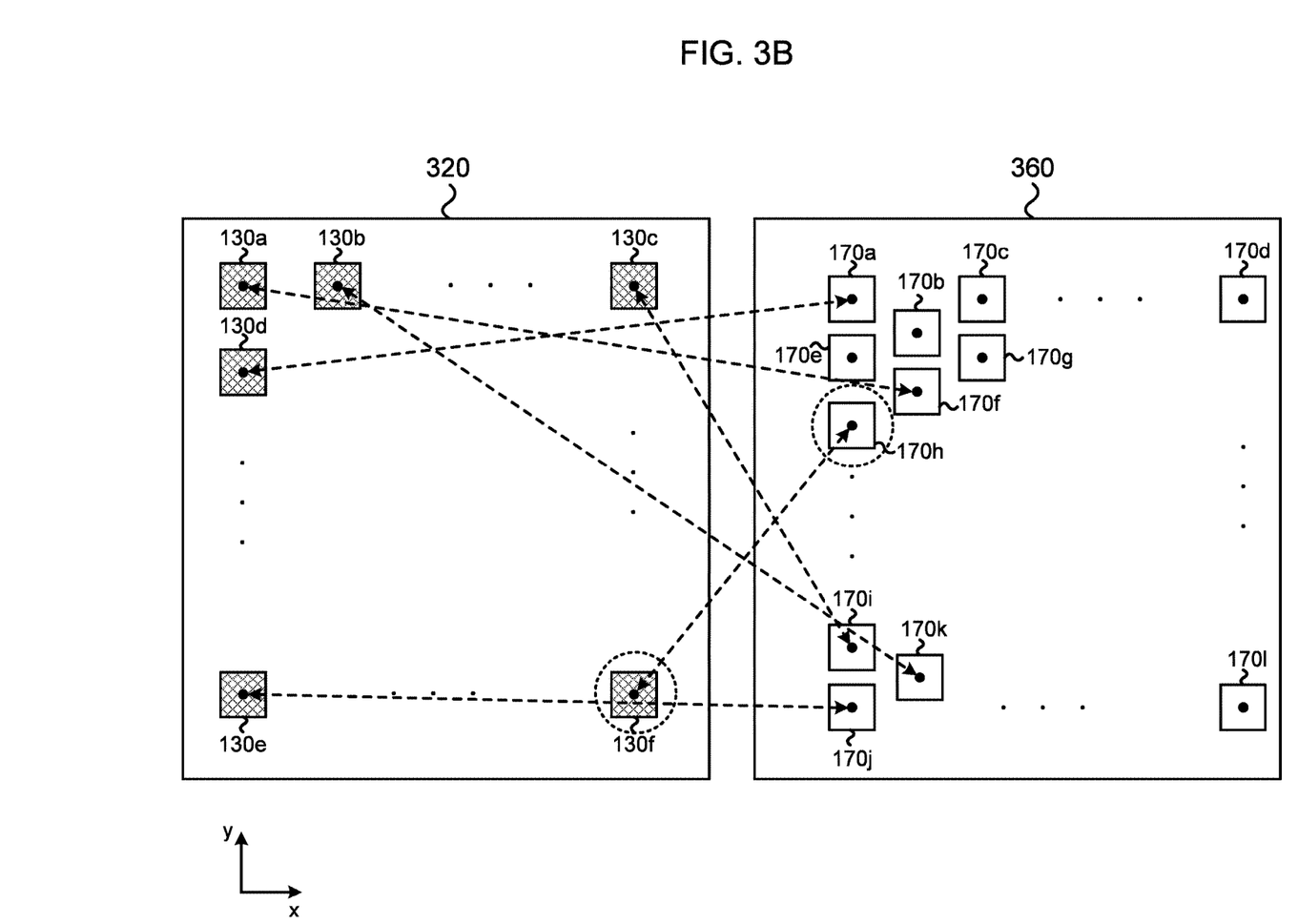
FIG. 3B illustrates a portion of a 3D stacked device with improved data flow, according to an example.

FIG. 3B illustrates a portion of a 3D stacked device with improved data flow, according to an example. In FIG. 3B, the chips 320 and 360 may substantially correspond to the chips 120 and 160, respectively, in FIG. 1. In this example, the tiles 130a, 130b, 130c, 130d, 130e, and 130f in the chip 320 are assigned to the tiles 170f, 170k, 170i, 170a, 170j, and 170h, respectively, in the chip 360. As illustrated in FIG. 3B, a total of F (e.g., F=6) buses (e.g., represented by dashed double-sided arrows) are realized as a result of the pin group assignment in the flowchart 220 in FIG. 2B. Each of the buses starts from the geometric center of a tile 130 and terminates at the geometric center of a tile 170. It is noted that not all of the tiles 170 are assigned to a tile 130. Specifically, the tiles 170b, 170c, 170d, 170e, 170g, and 170l are not paired with any of the tiles 130.

After the pin group assignment in the flowchart 220, vertical alignment of the tiles 130 and 170 is optimized so as to minimize the worst case latency in data movement among different layers in the 3D stacked device.

Figure 2C:
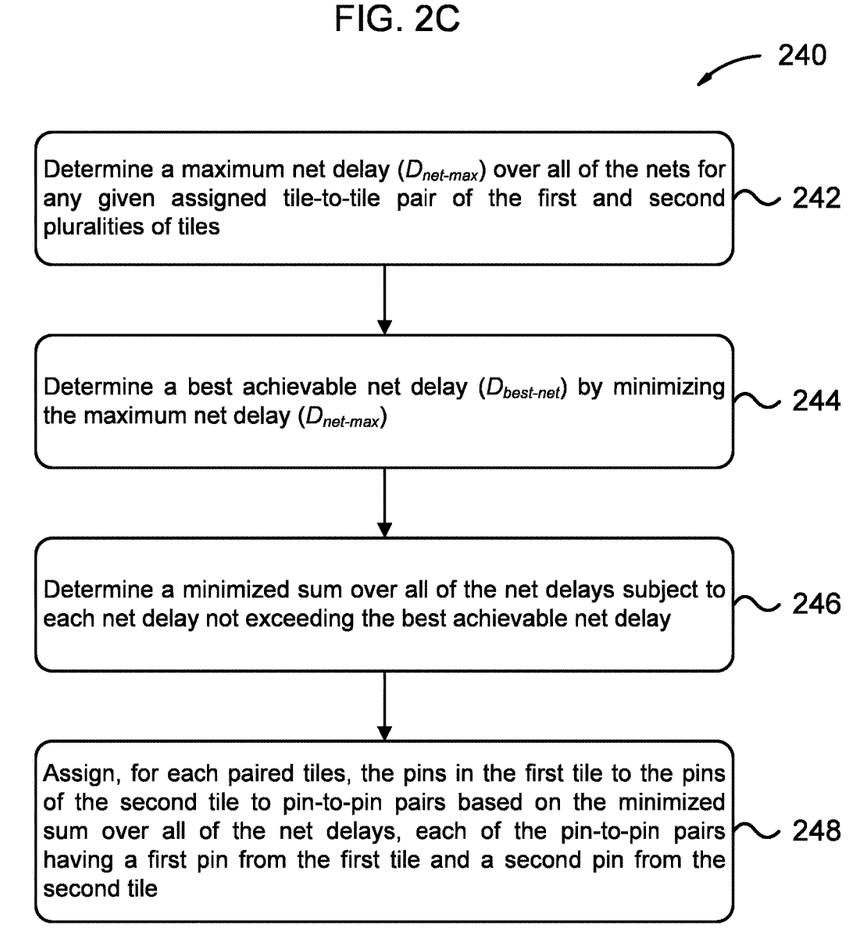
FIG. 2C illustrates a flowchart for actual pin assignments in a 3D stacked device with improved data flow, according to an example.

FIG. 2C illustrates a flowchart 240 for actual pin assignments in a 3D stacked device with improved data flow, according to an example. In one embodiment, the flowchart 240 may substantially correspond to block 212 in FIG. 2A for assigning each of the first plurality of pins in the first tile and a corresponding one of the second plurality of pins in the second tile to a pin-to-pin pair. In FIG. 2C, the flowchart 240 performs the actual pin assignments for each of the paired tiles (e.g., the paired tiles 130 and 170 in FIG. 3B), where each pair of pins is to be connected by a net in an assigned bus (e.g., each net connecting one pin in a tile 130 to one pin in a paired tile 170) so that the resulting actual pin assignments further optimize connectivity among the actual pins in the aligned tiles to reduce routing congestion and achieve least-latency and highest bandwidth inter-chip communication.

In block 242, the flowchart 240 determines a maximum net delay ($D_{net-max}$) over all of the nets for any given tile-to-tile pair of the first and second pluralities of tiles assigned according to the pin group assignments described with reference to the flowchart 220 in FIG. 2B. That is, the maximum net delay ($D_{net-max}$) is the maximum delay among each of the individual nets between the paired tiles.

It is noted that, in this embodiment, even though the actual pin-to-pin assignments are identical for each paired tiles 130 and 170, the delays of the same net (e.g., the same pin-to-pin assignment) in different paired tiles can be different. In other words, the pin-to-pin assignments for one particular pair of tiles may not be the optimal assignment for the other paired tiles because the length of the same net in different paired tiles is different. As the performance of the device is determined, at least in part, by the worst net (e.g., pin-to-pin) delay, the actual pin assignment approach according to this embodiment takes into consideration of delays of all of the nets in all of the paired tiles (e.g., the paired tiles 130 and 170). To accomplish this, one pair of the tiles is selected as a representative pair and all other paired tiles are represented in relation to the representative pair. In other words, each of the paired tiles 130 and 170 (other than the representative pair) is to have an offset version of the physical pin assignments of the representative pair. For example, all of the x and y coordinates (e.g., the location) of the pins of the other paired tiles can be expressed in terms of the representative pair's x and y coordinates with a respective offset. Hence, the representative pair's pin coordinates (e.g., the x and y coordinates) are the only independent variables.

In this embodiment, the variables for the representative pair of tiles 130 and 170 are defined as follows:

$RepN_{a,b}$ is a Boolean variable that represents the logical pin a goes to physical location b for the representative tile 130 (e.g., the tile 130f in FIG. 3B). In this example, it is assumed that the each tile 130 contains N pins.

$RepM_{a,b}$ is another Boolean variable that represents the logical pin a goes to physical location b for the representative tile 170 (e.g., the tile 170h in FIG. 3B). In this example, it is assumed that the each tile 170 contains M pins.

In this example, it is assumed that one logical pin is assigned (or mapped) to one physical pin. Hence, the following relationships hold:

$$\sum_{\forall b} RepN_{a,b} = 1, \quad \text{Equation (5)}$$

$$\sum_{\forall a} RepN_{a,b} = 1, \quad \text{Equation (6)}$$

$$\sum_{\forall b} RepM_{a,b} = 1, \quad \text{Equation (7)}$$

$$\sum_{\forall a} RepM_{a,b} = 1. \quad \text{Equation (8)}$$

The x and y coordinates of every pin in the other paired tiles can be represented in terms of the ones in the representative pair. For example, if a logical pin a is assigned (or mapped) to a physical location b for the representative tile 130, then for another tile 130 (e.g., the $n^{th}$ tile 130), the corresponding location for the logical pin a is known. For example, the x coordinate is:

$$x_b + \text{Offset}(n, b), \quad \text{Equation (9)}$$

the y coordinate is:

$$y_b + \text{Offset}(n, b). \quad \text{Equation (10)}$$

For the x coordinate of the $n^{th}$ tile 130, logical pin a, the variables can be represented as:

$$x_{n,b} = \sum_{\forall b} (RepNa, b \times (x_b + \text{Offset}(n, b))). \quad \text{Equation (11)}$$

Similar, for the y coordinate of the $n^{th}$ tile 130, logical pin a, the variables can be represented as:

$$y_{n,b} = \sum_{\forall b} (RepNa, b \times (y_b + \text{Offset}(n, b))). \quad \text{Equation (12)}$$

Similar equations can be derived for the x and y coordinates of the pins in the tiles 170. For example, for the x coordinate of the m$^{th}$ tile 170, logical pin a, the variables can be represented as:

$$x_{m,a} = \sum_{\forall b}(RepMa, b \times (x_b + \text{Offset}(m, b))). \quad \text{Equation (13)}$$

For the y coordinate of the m$^{th}$ tile 170, logical pin a, the variables can be represented as:

$$y_{m,a} = \sum_{\forall b}(RepMa, b \times (y_b + \text{Offset}(m, b))). \quad \text{Equation (14)}$$

In this example, the variables $\min_{n,x}$ and $\max_{n,x}$ correspond to the least and the largest x coordinates, respectively, of all pins incident on a net n. Similarly, the variables $\min_{n,y}$ and $\max_{n,y}$ correspond to the least and the largest y coordinates, respectively, of all pins incident on the net n. Thus, these variables can be defined in terms of the coordinate of the i$^{th}$ pin ($x_i$, $y_i$) as follows:

$$\min_{n,x} \leq x_k \forall k \in \text{net}_n, \quad \text{Equation (15)}$$
$$\max_{n,x} \geq x_k \forall k \in \text{net}_n, \quad \text{Equation (16)}$$
$$\min_{n,y} \leq y_k \forall k \in \text{net}_n, \quad \text{Equation (17)}$$
$$\max_{n,y} \geq y_k \forall k \in \text{net}_n, \quad \text{Equation (18)}$$

where k is an index that runs over all pins of the net n.
It is noted that i covers all pins in every instance of the paired tiles 130 and 170.

In this example, the delay for net n is defined as $D_n$, where $$D_n = \max_{n,x} - \min_{n,x} + \max_{n,y} - \min_{n,y}. \quad \text{Equation (19)}$$

Hence, the maximum net delay ($D_{net-max}$) can be determined by:

$$D_{net-max} = \max(D_n) \forall \text{ net}_n. \quad \text{Equation (20)}$$

In block 244, the flowchart 240 determines a best achievable net delay ($D_{best-net}$) by minimizing the maximum net delay ($D_{net-max}$). For example, after the maximum net delay ($D_{net-max}$) over all of the nets for the tile-to-tile pairs are determined in block 242, the flowchart 240 in block 244 determines the smallest maximum net delay and assigns the value to the best achievable net delay ($D_{best-net}$).

In block 246, the flowchart 240 determines a minimized sum over all of the net delays subject to each net delay not exceeding the best achievable net delay. For example, block 246 minimizes the sum of $D_n$ under the constraint $D_n \leq D_{best-net}$. Once the minimized sum over all the net delays is determined, in block 248, the flowchart 240 assigns the actual pins between each of the paired tiles. It is noted that blocks 246 and 248 in the flowchart 240 may be substantially similar to blocks 226 and 228, respectively, in the flowchart 220. Hence, the details of blocks 246 and 248 are omitted for brevity.

Figure 3C:
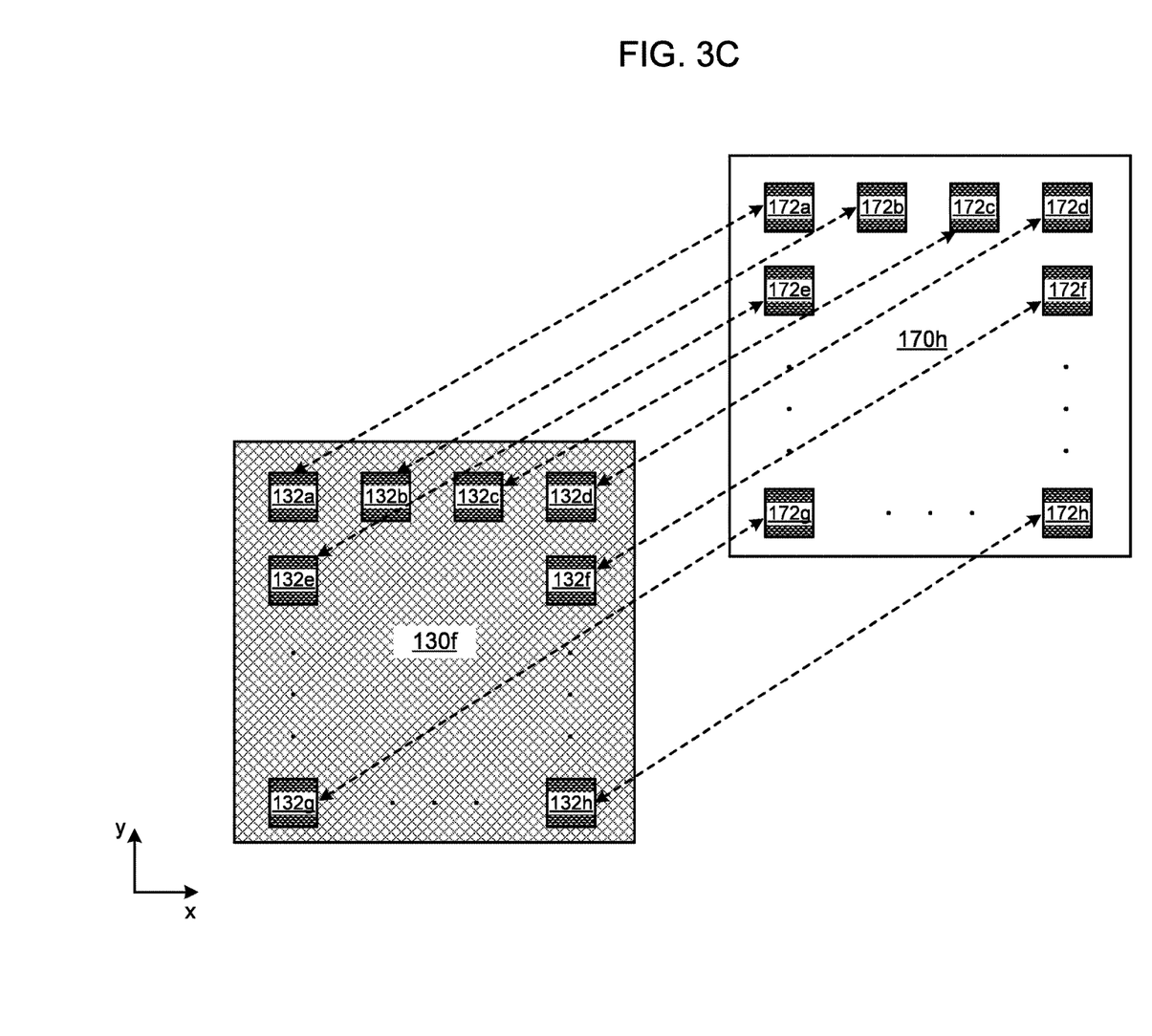
FIG. 3C illustrates a portion of a 3D stacked device with improved data flow, according to an example.

FIG. 3C illustrates a portion of a 3D stacked device with improved data flow, according to an example. In FIG. 3C, the tiles 130*f* and 170*h* may substantially correspond to the tiles 130*f* and 170*h*, respectively, in FIG. 3B. In this example, the pins 132*a*, 132*b*, 132*c*, 132*d*, 132*e*, 132*f*, 132*g*, and 132*h* in the tile 130*f* are respectively assigned and coupled to (e.g., by nets represented by dashed double-sided arrows) the tiles 172*a*, 172*b*, 172*c*, 172*d*, 172*e*, 172*f*, 172*g*, and 172*h* in the tile 170*h*, as a result of the actual pin assignment described with reference the flowchart 240 in FIG. 2C. In this example, while the tiles 130*f* and 170*h* have the same number of pins at the same locations as illustrated in FIG. 3C, in another assigned tile-to-tile pair, each tile may have a different number of pins at different locations.

Figure 4:
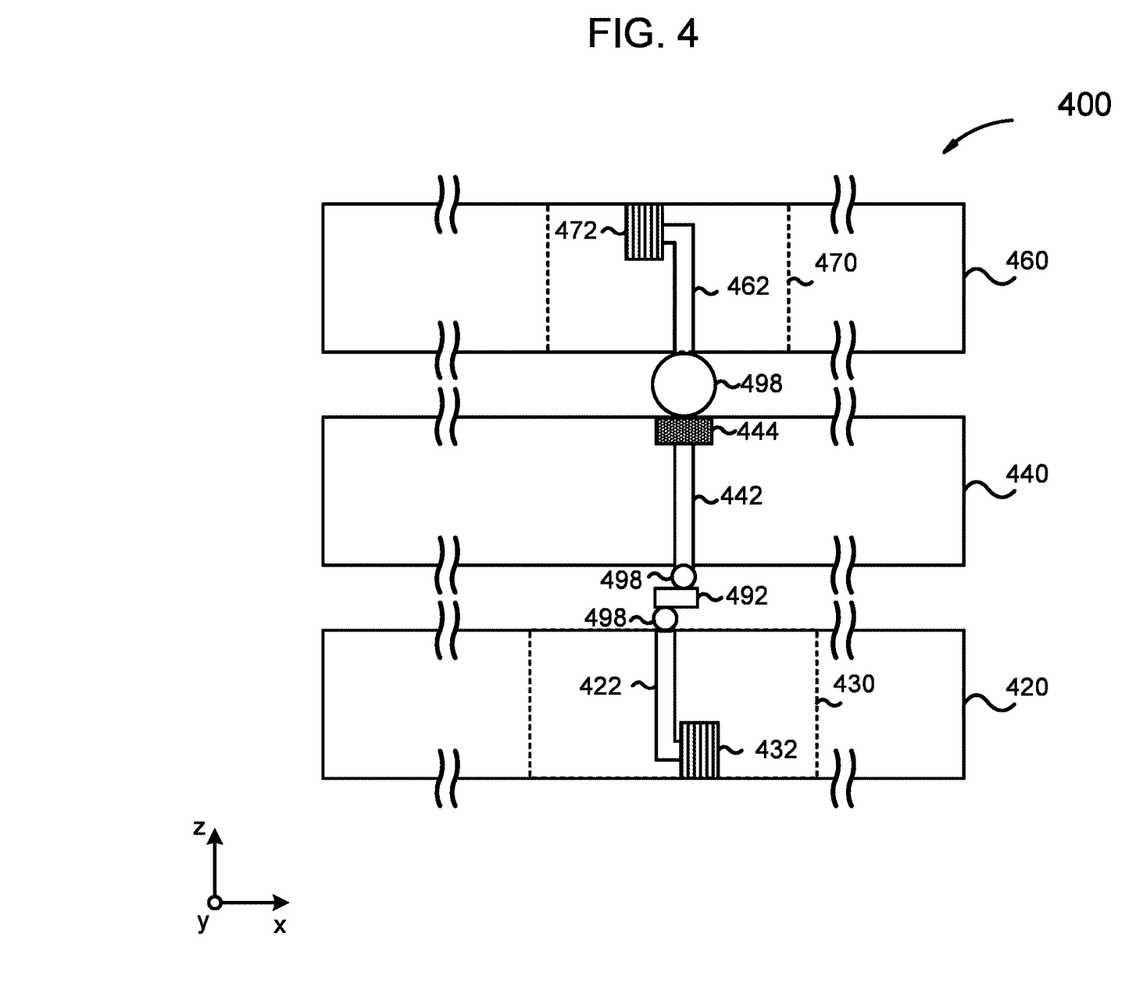
FIG. 4 illustrates a portion of a 3D stacked device with improved data flow, according to an example.

FIG. 4 illustrates a portion of a 3D stacked device 400 with improved data flow, according to one example. As illustrated in FIG. 4, the 3D stacked device 400 includes three semiconductor chips 420, 440, and 460, which may substantially correspond to the semiconductor chips 120, 140, and 160, respectively in FIG. 1. As shown in FIG. 4, the semiconductor chip 420 includes at least one tile 430, which may substantially correspond to any one of the tiles 130 in FIG. 1. Also, the semiconductor chip 460 includes at least one tile 470, which may substantially correspond to any one of the tiles 170 in FIG. 1.

In this example, the 3D stacked device 400 includes a pin-to-pin connection (e.g., a net) between a pin 432 in a first tile 430 on the first chip 420 and a pin 472 in a second tile 470 on the second chip 460. As illustrated in FIG. 4, the pin 432 is electrically coupled to the pin 472 through an electrical connection 422 in the tile 430, an electrical connection 492 between the chips 420 and 440, a TSV 442 and an interconnect 444 in the chip 440, and an electrical connection 462 in the tile 470. It is noted that, as illustrated in FIG. 4, various inter-chip connections are made with electrical material 498, such as solder bumps and the like.

As illustrated in FIG. 4, the tiles 430 and 470 are substantially aligned as a result of the pin group assignment described with reference to the flowchart 220 in FIG. 2B. In addition, the pins 432 and 472 are an assigned pin-to-pin pair as a result of the actual pin assignment described with reference to the flowchart 240 in FIG. 2C. As illustrated in FIG. 4, the interface of the chip 420 and the interface of the chip 440 are substantially aligned. Also, the interface of the chip 440 and the interface of the chip 460 are substantially aligned. As such, the distance that data has to travel on the chip 440 (having programmable logic) is substantially minimized, thereby minimizing transmission latency and maximizing data bandwidth.

According to some embodiments of the present disclosure, chiplet interface, interim layers and memories are optimally aligned to enable low latency programmable connections, which maximize the bandwidth between chiplets and memories on different layers.

According to some embodiments of the present disclosure, different latencies are designed for channels travelling different distances (between chiplet and AI engines) on the same device. Pipeline stages are proportional to distance travelled on the device. In some embodiments, memory channels may be used to drive individual AIE tiles, where programmable logic circuitry may be used to route data. The routing method as disclosed in the present disclosure can be used to determine which memory channel will drive which AIE tile and optimize alignment.

According to some embodiments of the present disclosure, chiplet sources are aligned to compute sinks (as much as mathematically possible on the given device).

According to some embodiments of the present disclosure, stagger placement of sinks is utilized such that the pin utilization in local regions is minimized, while efficiency of track utilization is maximized. Different distances allow for resources of different lengths to be used. While lowered pin density reduces local congestion, thus improving local routing and reducing delay.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A method for forming a 3D stacked device having a plurality of semiconductor chips stacked vertically on each other, the method comprising:
    providing a first plurality of tiles in a first semiconductor chip of the plurality of semiconductor chips;
    providing a second plurality of tiles in a second semiconductor chip of the plurality of semiconductor chips;
    assigning each of the first plurality of tiles to a corresponding one of the second plurality of tiles to form tile-to-tile pairs;
    determining a minimized sum of bus delays among the tile-to-tile pairs; and
    electrically coupling each of the first plurality of tiles to the corresponding one of the second plurality of tiles through buses based on the assignments.

2. The method of claim 1, wherein:
    each of the assigned tile-to-tile pairs includes a first tile from the first plurality of tiles and a second tile from the second plurality of tiles; and
    each of the bus delays is proportionally related to a distance between a geometric center of the first tile and a geometric center of the second tile projected on a plane parallel to at least one of the first and second semiconductor chips.

3. The method of claim 1, wherein the assigning each of the first plurality of tiles in the first semiconductor chip and the corresponding one of the second plurality of tiles in the second semiconductor chip to the tile-to-tile pair comprises:
    determining a maximum bus delay for each assignment of the first plurality of tiles in the first semiconductor chip and the second plurality of tiles in the second semiconductor chip;
    determining a best achievable bus delay by minimizing the maximum bus delay; and
    determining the minimized sum of bus delays subject to each of the bus delays not exceeding the best achievable bus delay.

4. The method of claim 1, wherein each of the assigned tile-to-tile pairs includes a first tile from the first plurality of tiles and a second tile from the second plurality of tiles; and wherein the method further comprises:
    providing a first plurality of pins in the first tile;
    providing a second plurality of pins in the second tile;
    assigning each of the first plurality of pins in the first tile and a corresponding one of the second plurality of pins in the second tile to a pin-to-pin pair, each of the pin-to-pin pairs including a first pin from the first tile and a second pin from the second tile;
    electrically coupling each of the first plurality of pins to a corresponding one of the second plurality of pins through a net based on the assignments; and
    wherein the assignments of the first plurality of pins to the second plurality of pins define a minimized sum of net delays among pin-to-pin pairs.

5. The method of claim 4, wherein the assigning each of the first plurality of pins in the first tile and a corresponding one of the second plurality of pins in the second tile to a pin-to-pin pair comprises:
    determining a maximum net delay over each net for each of the assigned tile-to-tile pairs;
    determining a best achievable net delay by minimizing the maximum net delay; and
    determining the minimized sum of net delays subject to each of the net delays not exceeding the best achievable net delay.

6. The method of claim 4, wherein each of the net delays is proportionally related to a distance between the first pin and the second pin projected on a plane parallel to at least one of the first and second semiconductor chips.

7. The method of claim 1, wherein the first plurality of tiles comprises data processing tiles.

8. The method of claim 1, wherein the second plurality of tiles comprises memory tiles.

9. The method of claim 1, further comprising:
    providing a third semiconductor chip configured to route data between the first semiconductor chip and the second semiconductor chip.

10. The method of claim 1, wherein a number of the first plurality of tiles is less than or equal to a number of the second plurality of tiles.

11. A method for forming a 3D stacked device, the method comprising:
    providing a first plurality of tiles in a first semiconductor chip;
    providing a second plurality of tiles in a second semiconductor chip stacked vertically on the first semiconductor chip;
    assigning each of the first plurality of tiles to a corresponding one of the second plurality of tiles to form tile-to-tile pairs;
    providing a third semiconductor chip between the first and second semiconductor chips;
    determining a least of total bus delays among the tile-to-tile pairs; and
    electrically coupling each of the first plurality of tiles to a corresponding one of the second plurality of tiles using buses on the third semiconductor chip based on the least of total bus delays.

12. The method of claim 11, wherein the determining a least of total bus delays among the tile-to-tile pairs comprises:

determining a maximum bus delay for each assignment of the first plurality of tiles in the first semiconductor chip and the second plurality of tiles in the second semiconductor chip;

determining a best achievable bus delay by minimizing the maximum bus delay; and determining the least of total bus delays subject to each of the bus delays not exceeding the best achievable bus delay.

13. The method of claim 11, further comprising:

providing a first plurality of pins in a first tile of each of the assigned tile-to-tile pairs;

providing a second plurality of pins in a second tile of a corresponding one of the assigned tile-to-tile pairs;

assigning each of the first plurality of pins to a corresponding one of the second plurality of pins to form pin-to-pin pairs;

determining a least of total net delays among the pin-to-pin pairs within the assigned tile-to-tile pairs; and electrically coupling each of the first plurality of pins to a corresponding one of the second plurality of pins.

14. The method of claim 13, wherein the determining a least of total net delays among the pin-to-pin pairs within the assigned tile-to-tile pairs comprises:

determining a maximum net delay over each net delay for each of the assigned tile-to-tile pairs;

determining a best achievable net delay by minimizing the maximum net delay; and determining the least of total net delays subject to each of the net delays not exceeding the best achievable net delay.

15. The method of claim 13, wherein each of the net delays is proportionally related to a distance between the first pin and the second pin projected on the third semiconductor chip.

16. The method of claim 11, wherein the first plurality of tiles comprises data processing tiles.

17. The method of claim 11, wherein the second plurality of tiles comprises memory tiles.

18. A method for forming a 3D stacked device, the method comprising:

providing a first plurality of tiles in a first semiconductor chip;

providing a second plurality of tiles in a second semiconductor chip stacked vertically on the first semiconductor chip;

assigning each of the first plurality of tiles to a corresponding one of the second plurality of tiles to form tile-to-tile pairs;

providing a third semiconductor chip between the first and second semiconductor chips;

determining a least of total bus delays among the tile-to-tile pairs;

grouping each of the first plurality of tiles in the first semiconductor chip and a corresponding one of the second plurality of tiles in the second semiconductor chip to the tile-to-tile pairs based on the least of total bus delays;

providing a first plurality of pins in a first tile of each of the grouped tile-to-tile pairs;

providing a second plurality of pins in a second tile of a corresponding one of the assigned tile-to-tile pairs;

assigning each of the first plurality of pins to a corresponding one of the second plurality of pins to form pin-to-pin pairs;

determining a least of total net delays among the pin-to-pin pairs within the grouped tile-to-tile pairs; and electrically coupling each of the first plurality of pins to a corresponding one of the second plurality of pins.

19. The method of claim 18, wherein the determining a least of total bus delays among the tile-to-tile pairs comprises:

determining a maximum bus delay for each assignment of the first plurality of tiles in the first semiconductor chip and the second plurality of tiles in the second semiconductor chip;

determining a best achievable bus delay by minimizing the maximum bus delay; and determining the least of total bus delays subject to each of the bus delays not exceeding the best achievable bus delay.

20. The method of claim 18, wherein the determining a least of total net delays among the pin-to-pin pairs within the grouped tile-to-tile pairs comprises:

determining a maximum net delay over each net delay for each of the grouped tile-to-tile pairs;

determining a best achievable net delay by minimizing the maximum net delay; and determining the least of total net delays subject to each of the net delays not exceeding the best achievable net delay.

* * * * *